(12) United States Patent
Yoshimatsu et al.

(10) Patent No.: US 10,981,584 B2
(45) Date of Patent: Apr. 20, 2021

(54) WHEEL LOAD ADJUSTING APPARATUS OF RAILCAR

(71) Applicant: KAWASAKI JUKOGYO KABUSHIKI KAISHA, Kobe (JP)

(72) Inventors: Yuta Yoshimatsu, Kobe (JP); Takafumi Okamoto, Kobe (JP); Takehiro Nishimura, Kobe (JP); Yoshi Sato, Sanda (JP); Keiichiro Kamura, Kobe (JP); Koichi Murata, Kobe (JP); Hirohide Matsushima, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 313 days.

(21) Appl. No.: 16/097,428

(22) PCT Filed: Apr. 27, 2017

(86) PCT No.: PCT/JP2017/016693
§ 371 (c)(1),
(2) Date: Oct. 29, 2018

(87) PCT Pub. No.: WO2017/188367
PCT Pub. Date: Nov. 2, 2017

(65) Prior Publication Data
US 2019/0135310 A1    May 9, 2019

(30) Foreign Application Priority Data
Apr. 28, 2016    (JP) .............................. JP2016-090612

(51) Int. Cl.
*B61F 5/10* (2006.01)
*B61F 5/22* (2006.01)
(Continued)

(52) U.S. Cl.
CPC .................. *B61F 5/10* (2013.01); *B61F 5/22* (2013.01); *B61F 5/52* (2013.01); *B60G 17/0195* (2013.01);
(Continued)

(58) Field of Classification Search
CPC ..... B61F 5/10; B61F 5/22; B61F 5/52; B60G 17/0195; B60G 21/06; B60G 99/008; B60G 2202/152
See application file for complete search history.

(56) References Cited

U.S. PATENT DOCUMENTS 4,693,185 A * 9/1987 Easton ....................... B61F 5/10
                                                          105/198.1
2014/0175717 A1* 6/2014 Jackson, Jr. ........... B21D 53/88
                                                          267/64.27
(Continued)

FOREIGN PATENT DOCUMENTS

JP    2003-165436 A    6/2003
JP    2014-073797 A    4/2014

*Primary Examiner* — Jason C Smith
(74) *Attorney, Agent, or Firm* — Oliff PLC (57) ABSTRACT

A wheel load adjusting apparatus used in a railcar, and the railcar includes: first and second air springs arranged between a carbody and a first bogie so as to be spaced apart from each other in a car width direction; third and fourth air springs arranged between the carbody and a second bogie so as to be spaced apart from each other in the car width direction; and first to fourth automatic level controlling valves provided upstream of the first four air springs and configured to adjust heights of the four air springs to maintain constant height of the air springs, wherein when the railcar passes through a curve, the wheel load adjusting apparatus limits an air supply/air discharge operation of at least one of the four automatic level controlling valves to suppress an increase in a pressure difference between at least two of the four air springs.

12 Claims, 9 Drawing Sheets

(51) Int. Cl.
*B61F 5/52* (2006.01)
*B60G 17/0195* (2006.01)
*B60G 21/06* (2006.01)
*B60G 99/00* (2010.01)

(52) U.S. Cl.
CPC ............ *B60G 21/06* (2013.01); *B60G 99/008* (2013.01); *B60G 2202/152* (2013.01); *B60G 2400/61* (2013.01)

(56) References Cited

U.S. PATENT DOCUMENTS

| | | | |
|---|---|---|---|
| 2014/0230687 A1* | 8/2014 | Jackson, Jr. | B60G 11/62 105/198.1 |
| 2015/0167772 A1* | 6/2015 | Street | B61F 5/10 267/64.27 |
| 2017/0158210 A1* | 6/2017 | Katahira | B61F 5/10 |
| 2018/0010664 A1* | 1/2018 | Leonard | F16F 9/32 |
| 2018/0297616 A1* | 10/2018 | Yamada | B61F 5/10 |
| 2019/0118839 A1* | 4/2019 | Chen | B61F 5/06 |
| 2019/0135310 A1* | 5/2019 | Yoshimatsu | B61F 5/10 |
| 2019/0315380 A1* | 10/2019 | Clavier | B61F 5/144 |

* cited by examiner

WHEEL LOAD ADJUSTING APPARATUS OF RAILCAR

TECHNICAL FIELD

The present invention relates to a wheel load adjusting apparatus of a railcar.

BACKGROUND ART

A railcar is equipped with an automatic level controlling valve configured to supply and discharge air to and from an air spring interposed between a carbody and a bogie. When the air spring expands in a vertical direction, the automatic level controlling valve discharges air from the air spring. When the air spring contracts in the vertical direction, the automatic level controlling valve supplies compressed air to the air spring.

Figure 12:
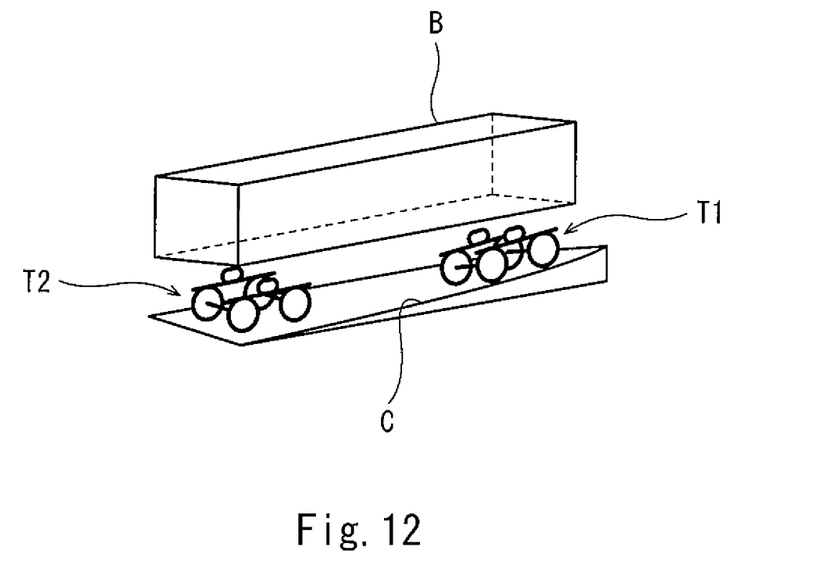
FIG. 12 is a schematic diagram for explaining a case where the railcar passes through a curve.

As shown in FIG. 12, when a railcar passes through a transition curve (i.e., an entrance part) of a track curve having a cant C, the size of the cant C is different between the position of a front bogie T1 and the position of a rear bogie T2. Therefore, when a railcar in which an existing rigid carbody B is supported by the bogies T1 and T2 through typical air springs travels through the transition curve, torsional force acts on the carbody B. With this, load balance among the air springs is lost, and therefore, wheel load variation occurs. Then, the air in the air spring which has been expanded in the vertical direction by the torsion of the carbody is discharged by the automatic level controlling valve, and this further decreases the pressure of the air spring. Thus, a decrease of wheel load is promoted.

According to an apparatus of PTL 1, the torsional force acting on the carbody when the railcar travels through a curve is eased by adjusting the heights of the air springs, located at a rear side in a traveling direction, in accordance with the bogie located at a front side in the traveling direction and a tilt angle of the carbody in a car width direction.

CITATION LIST

Patent Literature

PTL 1: Japanese Laid-Open Patent Application Publication No. 2014-73797

SUMMARY OF INVENTION

Technical Problem

However, the apparatus of PTL 1 adjusts the height of the air spring and does not adjust the pressure of the air spring. Therefore, even when the torsion of the carbody is eased, the wheel load variation occurs by pressure differences among the air springs.

An object of the present invention is to reduce wheel load variation which occurs when a railcar travels through a curve.

Solution to Problem

A wheel load adjusting apparatus of a railcar according to one aspect of the present invention is a wheel load adjusting apparatus for use in a railcar, the railcar including: first and second air springs arranged between a carbody and a first bogie so as to be spaced apart from each other in a car width direction; third and fourth air springs arranged between the carbody and a second bogie so as to be spaced apart from each other in the car width direction; and first to fourth automatic level controlling valves provided upstream of the first to fourth air springs, respectively, and configured to adjust heights of the first to fourth air springs, respectively, to maintain the heights of the air springs constant, wherein when the railcar passes through a curve, the wheel load adjusting apparatus limits an air supply/air discharge operation of at least one of the first to fourth automatic level controlling valves so as to suppress an increase in a pressure difference between at least two of the first to fourth air springs.

According to the above configuration, the air supply/air discharge operation of at least one of the first to fourth automatic level controlling valves is limited so as to suppress the increase in the pressure difference between at least two of the first to fourth air springs when the railcar travels through the curve. Therefore, load balance between the air springs is prevented from being lost, and therefore, wheel load variation can be suppressed.

Advantageous Effects of Invention

The present invention can reduce wheel load variation when a railcar travels through a curve.

DESCRIPTION OF EMBODIMENTS

Hereinafter, embodiments will be explained with reference to the drawings. In the following explanation, a direction (i.e., a rail direction) in which a carbody of a railcar extends is defined as a car longitudinal direction, and a width direction (i.e., a sleeper direction) perpendicular to the car longitudinal direction is defined as a car width direction. In addition, a head side in a traveling direction in which the railcar travels is defined as a front side, and a side opposite to the front side is defined as a rear side.

Embodiment 1

Figure 1:
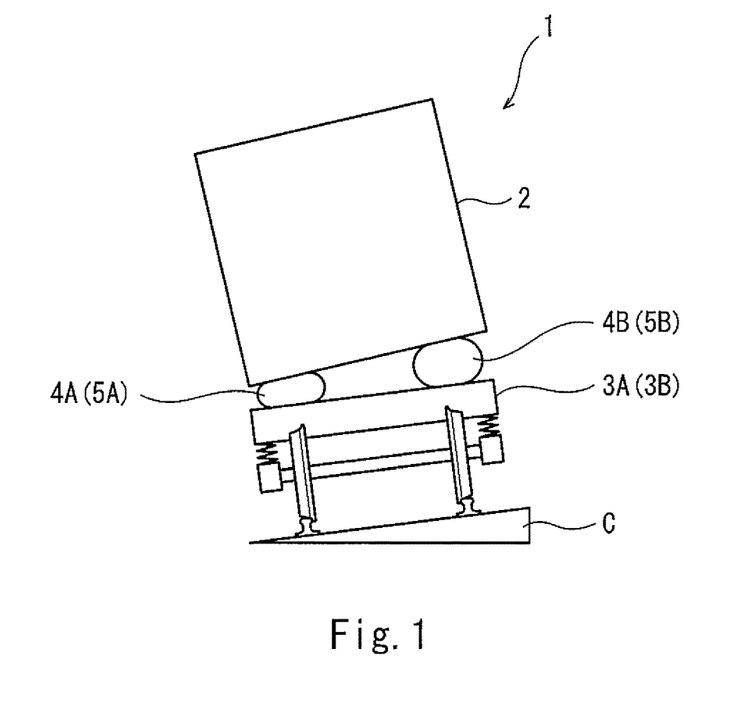
FIG. 1 is a schematic front view of a railcar according to Embodiment 1.
Figure 2:
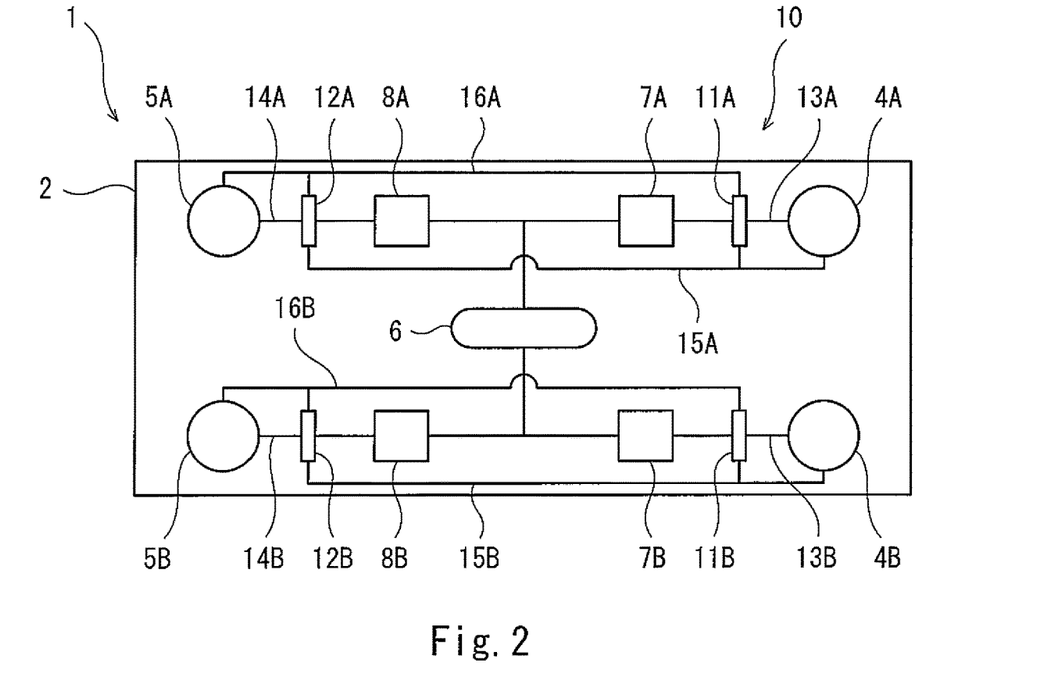
FIG. 2 is a plan view of a wheel load adjusting apparatus of the railcar shown in FIG. 1.
Figure 3:
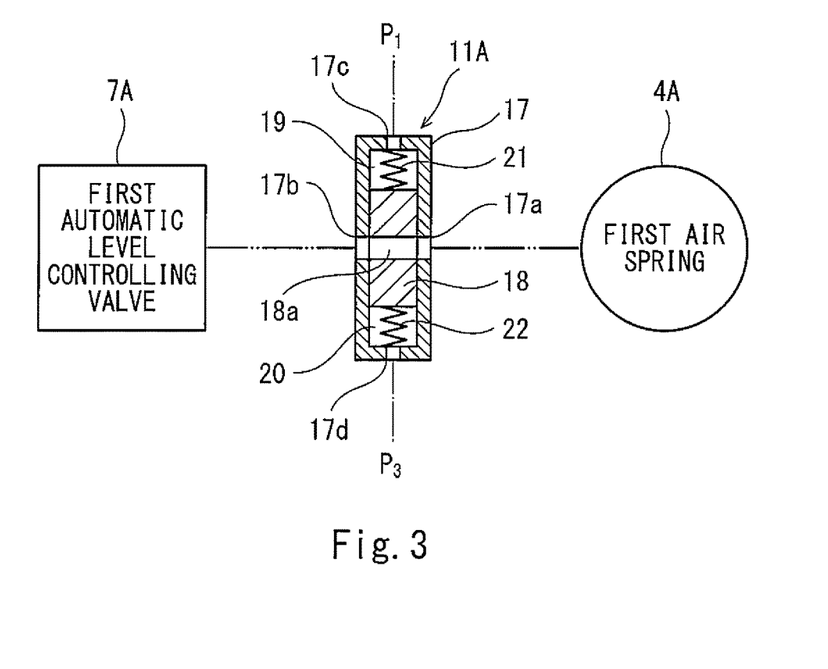
FIG. 3 is a schematic sectional view of a wheel load adjusting valve shown in FIG. 2.

FIG. 1 is a schematic front view of a railcar 1 according to Embodiment 1. FIG. 2 is a plan view of a wheel load adjusting apparatus 10 of the railcar 1 shown in FIG. 1. FIG. 3 is a schematic sectional view of a wheel load adjusting valve 4A shown in FIG. 2. As shown in FIG. 1, in a curved section of a track through which the railcar 1 travels, a cant C (difference in height) is provided at a rail installation surface such that a rail at an outer side of a curve is located higher than a rail at an inner side of the curve. As shown in FIGS. 1 and 2, the railcar 1 includes a carbody 2, first and second bogies 3A and 3B, first, second, third, and fourth air springs 4A, 4B, 5A, and 5B, an air container 6, first, second, third, and fourth automatic level controlling valves 7A, 7B, 8A, and 8B, and the wheel load adjusting apparatus 10. The carbody 2 has a substantially rectangular solid shape extending in the rail direction. The first bogie 3A is arranged at a first side in the car longitudinal direction and supports one car longitudinal direction end portion of the carbody 2. The second bogie 3B is arranged at a second side in the car longitudinal direction and supports the other car longitudinal direction end portion of the carbody 2.

The first air spring 4A and the second air spring 4B are arranged between the carbody 2 and the first bogie 3A so as to be spaced apart from each other in the car width direction. The first air spring 4A is arranged at a first side in the car width direction, and the second air spring 4B is arranged at a second side in the car width direction. The third air spring 5A and the fourth air spring 5B are arranged between the carbody 2 and the second bogie 3B so as to be spaced apart from each other in the car width direction. The third air spring 5A is arranged at the first side in the car width direction, and the fourth air spring 5B is arranged at the second side in the car width direction. The air container 6 stores compressed air. When a pressure in the air container 6 decreases to less than a predetermined value, a compressor (not shown) mounted on the railcar 1 supplies compressed air to the air container 6.

The first, second, third, and fourth automatic level controlling valves 7A, 7B, 8A, and 8B are known devices and also called leveling valves. The first, second, third, and fourth automatic level controlling valves 7A, 7B, 8A, and 8B are provided upstream of (i.e., provided closer to the air container 6 than) the first, second, third, and fourth air springs 4A, 4B, 5A, and 5B, respectively. The first, second, third, and fourth automatic level controlling valves 7A, 7B, 8A, and 8B adjust the heights of the first, second, third, and fourth air springs 4A, 4B, 5A, and 5B, respectively, to keep the heights of the air springs constant. The first automatic level controlling valve 7A supplies and discharges air to and from the first air spring 4A in mechanical conjunction with a change in a vertical interval between the carbody 2 and a car width direction first-side portion of a bogie frame of the first bogie 3A. The second automatic level controlling valve 7B supplies and discharges air to and from the second air spring 4B in mechanical conjunction with a change in a vertical interval between the carbody 2 and a car width direction second-side portion of the bogie frame of the first bogie 3A. The third automatic level controlling valve 8A supplies and discharges air to and from the third air spring 5A in mechanical conjunction with a change in a vertical interval between the carbody 2 and a car width direction first-side portion of a bogie frame of the second bogie 3B. The fourth automatic level controlling valve 8B supplies and discharges air to and from the fourth air spring 5B in mechanical conjunction with a change in a vertical interval between the carbody 2 and a car width direction second-side portion of the bogie frame of the second bogie 3B. To be specific, each of the first, second, third, and fourth automatic level controlling valves 7A, 7B, 8A, and 8B discharges air from the corresponding air spring (4A, 4B, 5A, 5B) when the height of the air spring (4A, 4B, 5A, 5B) is not less than a predetermined height. Further, each of the first, second, third, and fourth automatic level controlling valves 7A, 7B, 8A, and 8B supplies air to the corresponding air spring (4A, 4B, 5A, 5B) when the height of the air spring (4A, 4B, 5A, 5B) is less than a predetermined height.

The wheel load adjusting apparatus 10 limits an air supply/air discharge operation of at least one of the first, second, third, and fourth automatic level controlling valves 7A, 7B, 8A, and 8B so as to suppress an increase in a pressure difference between at least two of the first, second, third, and fourth air springs 4A, 4B, 5A, and 5B. As one example, the wheel load adjusting apparatus 10 includes: a first wheel load adjusting valve 11A provided at a first channel 13A connecting the first automatic level controlling valve 7A and the first air spring 4A; a second wheel load adjusting valve 11B provided at a second channel 13B connecting the second automatic level controlling valve 7B and the second air spring 4B; a third wheel load adjusting valve 12A provided at a third channel 14A connecting the third automatic level controlling valve 8A and the third air spring 5A; and a fourth wheel load adjusting valve 12B provided at a fourth channel 14B connecting the fourth automatic level controlling valve 8B and the fourth air spring 5B.

The wheel load adjusting apparatus 10 further includes: a first pilot pipe 15A through which the pressure of the first air spring 4A is transmitted as a pilot pressure to the first wheel load adjusting valve 11A and the third wheel load adjusting valve 12A; a second pilot pipe 15B through which the pressure of the second air spring 4B is transmitted as a pilot pressure to the second wheel load adjusting valve 11B and the fourth wheel load adjusting valve 12B; a third pilot pipe 16A through which the pressure of the third air spring 5A is transmitted as a pilot pressure to the first wheel load adjusting valve 11A and the third wheel load adjusting valve 12A; and a fourth pilot pipe 16B through which the pressure of the fourth air spring 5B is transmitted as a pilot pressure to the second wheel load adjusting valve 11B and the fourth wheel load adjusting valve 12B.

When a first differential pressure $\Delta P_A$ between the first and third air springs 4A and 5A arranged at the first side in the car width direction exceeds a threshold TH, the first wheel load adjusting valve 11A and the third wheel load adjusting valve 12A restrict or shut off the first channel 13A and the third channel 14A, respectively, to suppress an increase in the first differential pressure $\Delta P_A$, thereby limiting flow rates (air supply/air discharge operations) of the first automatic level controlling valve 7A and the third automatic level controlling valve 8A. When a second differential pressure $\Delta P_B$ between the second and fourth air springs 4B and 5B arranged at the second side in the car width direction exceeds the threshold TH, the second wheel load adjusting valve 11B and the fourth wheel load adjusting valve 12B restrict or shut off the second channel 13B and the fourth channel 14B, respectively, to suppress an increase in the second differential pressure $\Delta P_B$, thereby limiting flow rates (air supply/air discharge operations) of the second automatic level controlling valve 7B and the fourth automatic level controlling valve 8B.

As one example, as shown in FIG. 3, the first wheel load adjusting valve 11A is a differential pressure valve including a casing 17 and a spool 18. The spool 18 is accommodated in the casing 17 so as to be reciprocatingly displaceable. The casing 17 includes a connection port 17a communicating with the first air spring 4A and a connection port 17b communicating with the first automatic level controlling valve 7A. The spool 18 includes a passage 18a communicating with the connection ports 17a and 17b at a neutral position. A first pressure chamber 19 is formed between the casing 17 and one of displacement direction end surfaces of the spool 18, and a second pressure chamber 20 is formed between the casing 17 and the other displacement direction end surface of the spool 18.

A first coil spring 21 is accommodated in the first pressure chamber 19, and a second coil spring 22 is accommodated in the second pressure chamber 20. The casing 17 includes: a first pilot port 17c through which a pressure $P_1$ of the first air spring 4A is introduced into the first pressure chamber 19; and a second pilot port 17d through which a pressure $P_3$ of the third air spring 5A is introduced into the second pressure chamber 20. When the pressure $P_1$ of the first air spring 4A and the pressure $P_3$ of the third air spring 5A are equal to each other, the spool 18 is held at the neutral position by biasing force of the first coil spring 21 and biasing force of the second coil spring 22. When the first differential pressure $\Delta P_A$ exceeds the threshold TH, the spool 18 is displaced so as to restrict the first channel 13A. A restricted opening degree (i.e., the opening degree of the channel restricted) decreases as the first differential pressure $\Delta P_A$ increases. It should be noted that each of the second, third, and fourth wheel load adjusting valves 11B, 12A, and 12B is similar in configuration to the first wheel load adjusting valve 11A, detailed explanations thereof are omitted.

According to the above-explained configuration, when the railcar 1 passes through a curve, and the first differential pressure $\Delta P_A$ between the first air spring 4A arranged at the first side in the car width direction and the first side in the car longitudinal direction and the third air spring 5A arranged at the first side in the car width direction and the second side in the car longitudinal direction increases to exceed the threshold TH, the first wheel load adjusting valve 11A and the third wheel load adjusting valve 12A restrict or shut off the first channel 13A and the third channel 14A, respectively, so as to suppress the increase in the first differential pressure $\Delta P_A$. On this account, load balance between the first air spring 4A and the third air spring 5A is prevented from being lost, and therefore, wheel load variation can be suppressed. Similarly, the second wheel load adjusting valve 11B and the fourth wheel load adjusting valve 12B prevent the load balance between the second air spring 4B and the fourth air spring 5B from being lost, and therefore, the wheel load variation can be suppressed.

Further, for example, when the railcar 1 travels toward the right side in FIG. 2, passes through a curve that curves toward an obliquely lower right side, and passes through an entrance transition curve at low speed, the third air spring 5A provided at an outer rail side in the second bogie 3B located at the rear side in the traveling direction is expanded in the vertical direction by the torsion of the carbody 2, and therefore, the pressure of the third air spring 5A decreases. Further, the third automatic level controlling valve 8A tries to discharge air from the third air spring 5A. However, the flow of the air discharged is restricted or shut off by the third wheel load adjusting valve 12A. On this account, the pressure of the third air spring 5A is prevented from further decreasing, and therefore, the decrease of the wheel load can be prevented from being promoted.

Further, since the carbody 2 of the railcar 1 is long in the traveling direction, pitching hardly occurs as compared to rolling. Therefore, by adjusting the wheel load based on the differential pressure $\Delta P_A$ ($\Delta P_B$) between the first air spring 4A (second air spring 4B) arranged at the first side in the car longitudinal direction and the third air spring 5A (fourth air spring 5B) arranged at the second side in the car longitudinal direction, the threshold TH can be determined without adequately considering matters except for the passing of the curve, and the wheel load at the time of the passing of the curve can be accurately adjusted. Further, since the first, second, third, and fourth wheel load adjusting valves 11A, 11B, 12A, and 12B mechanically operate in accordance with the differential pressure $\Delta P_A$ ($\Delta P_B$), it is unnecessary to provide sensors and controllers.

Figure 4:
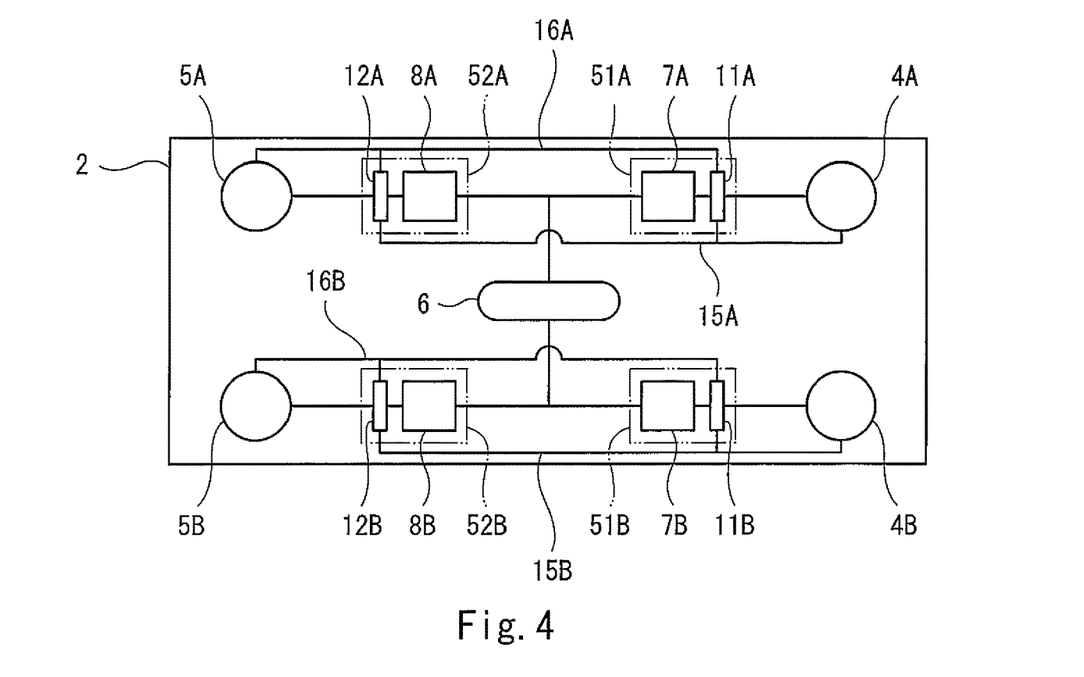
FIG. 4 is a plan view of a modified example of the wheel load adjusting apparatus shown in FIG. 2.

FIG. 4 is a plan view of the wheel load adjusting apparatus according to Modified Example. As shown in FIG. 4, the wheel load adjusting valve 11A (11B, 12A, 12B), a casing 51A (51B, 52A, 52B), and the automatic level controlling valve 7A (7B, 8A, 8B) may be configured as a unit by accommodating the wheel load adjusting valve 11A (11B, 12A, 12B) in the casing 51A (51B, 52A, 52B) in which the automatic level controlling valve 7A (7B, 8A, 8B) is accommodated. In this case, it becomes unnecessary to perform connecting work between the wheel load adjusting valve 11A (11B, 12A, 12B) and the automatic level controlling valve 7A (7B, 8A, 8B) at a car assembling site. Thus, assembling work efficiency improves. It should be noted that the unit formed by accommodating the wheel load adjusting valve and the automatic level controlling valve in one casing is applicable to below-described embodiments.

Embodiment 2

Figure 5:
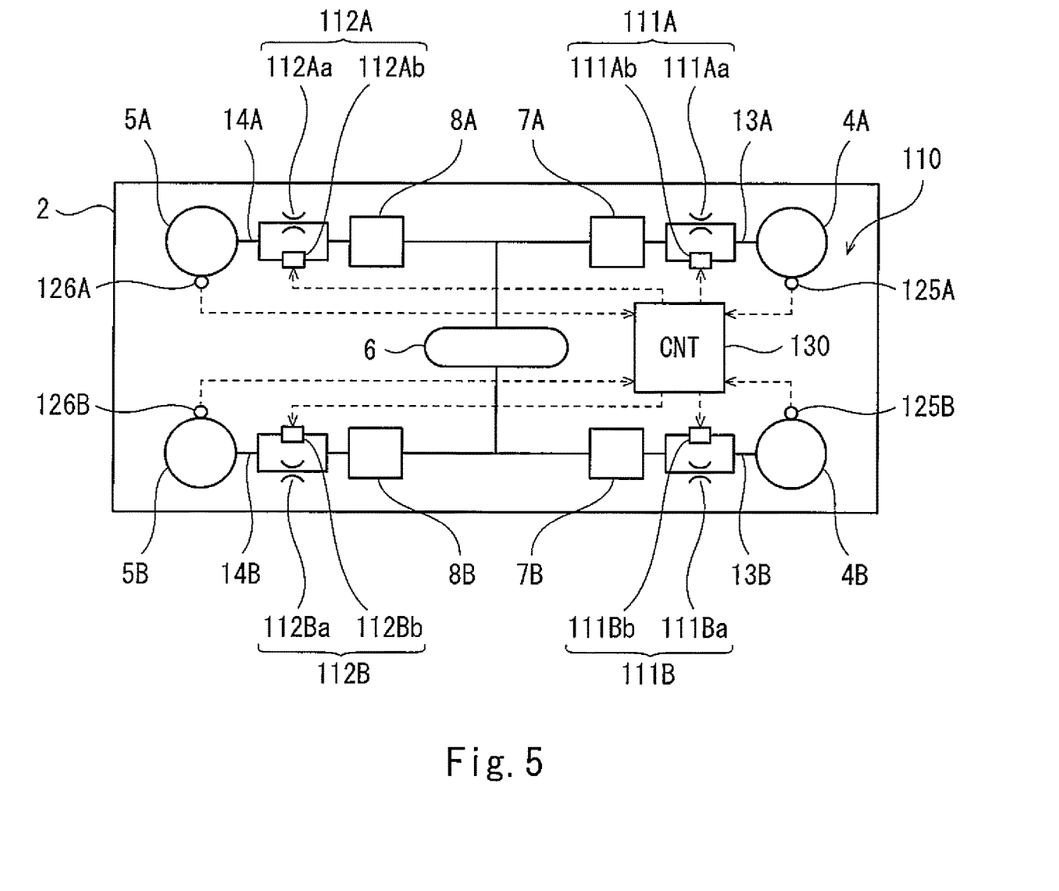
FIG. 5 is a plan view of the wheel load adjusting apparatus of the railcar according to Embodiment 2.

FIG. 5 is a plan view of a wheel load adjusting apparatus 110 of a railcar according to Embodiment 2. The same reference signs are used for the same components as in Embodiment 1, and a repetition of the same explanation is avoided. As shown in FIG. 5, the wheel load adjusting apparatus 110 includes first, second, third, and fourth wheel load adjusting valves 11A, 111B, 112A, and 112B, first, second, third, and fourth pressure sensors 125A, 125B, 126A, and 126B, and a controller 130.

The first wheel load adjusting valve 111A includes: a first fixed restrictor 111Aa provided at one of channel portions arranged in parallel in the first channel 13A; and a first electromagnetic shutoff valve 111Ab provided at the other channel portion. The second wheel load adjusting valve 111B includes: a second fixed restrictor 111Ba provided at one of channel portions arranged in parallel in the second channel 13B; and a second electromagnetic shutoff valve 111Bb provided at the other channel portion. The third wheel load adjusting valve 112A includes: a third fixed restrictor 112Aa provided at one of channel portions arranged in parallel in the third channel 14A; and a third electromagnetic shutoff valve 112Ab provided at the other channel portion. The fourth wheel load adjusting valve 112B includes: a fourth fixed restrictor 112Ba provided at one of channel portions arranged in parallel in the fourth channel 14B; and a fourth electromagnetic shutoff valve 112Bb provided at the other channel portion. It should be noted that each of the first, second, third, and fourth electromagnetic shutoff valves 111Ab, 111Bb, 112Ab, and 112Bb is a normally open valve and opens the corresponding channel when electric power is not supplied thereto.

The first, second, third, and fourth pressure sensors 125A, 125B, 126A, and 126B detect pressures of the first, second, third, and fourth air springs 4A, 4B, 5A, and 5B, respectively. The controller 130 controls the first, second, third, and fourth electromagnetic shutoff valves 111Ab, 111Bb, 112Ab, and 112Bb of the first, second, third, and fourth wheel load adjusting valves 11A, 111B, 112A, and 112B in accordance with the pressures detected by the first, second, third, and fourth pressure sensors 125A, 125B, 126A, and 126B.

Figure 6:
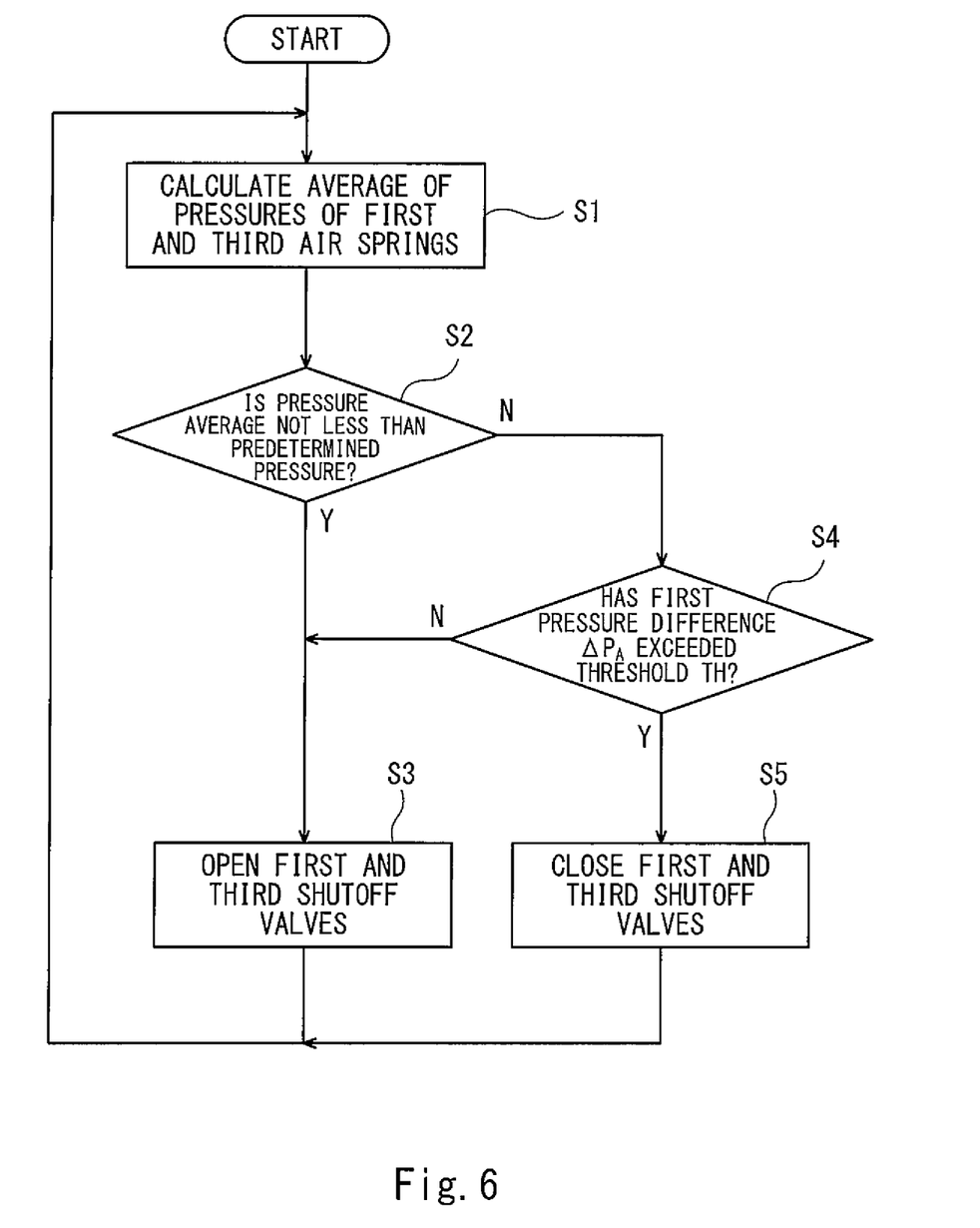
FIG. 6 is a flow chart for explaining operations of the wheel load adjusting apparatus shown in FIG. 5.

FIG. 6 is a flow chart for explaining operations of the wheel load adjusting apparatus 110 shown in FIG. 5. As shown in FIG. 6, the controller 130 determines whether or not the pressure detected by at least one of the first pressure sensor 125A and the third pressure sensor 126A satisfies a predetermined high pressure condition. As one example, the controller 130 calculates an average of the pressure detected by the first pressure sensor 125A and the pressure detected by the third pressure sensor 126A (Step S1) and determines whether or not the calculated pressure average is not less than a predetermined pressure (for example, not less than a pressure when the railcar is in a stop state) (Step S2). Instead of this, the controller 130 may determine whether or not the pressure detected by any one of the first pressure sensor 125A and the third pressure sensor 126A is not less than a predetermined pressure or may determine whether or not each of the pressure detected by the first pressure sensor 125A and the pressure detected by the third pressure sensor 126A is not less than a predetermined pressure.

When it is determined that the pressure average is not less than the predetermined pressure (Step S2), the controller 130 sets each of the first electromagnetic shutoff valve 111Ab and the third electromagnetic shutoff valve 112Ab to an open state (Step S3). This is because it is thought that even if the wheel load variation occurs, any of the wheel loads does not become extremely low. To be specific, when each of the pressure of the first air spring 4A and the pressure of the third air spring 5A satisfies the predetermined high pressure condition, the operation of preventing the increase in the first differential pressure $\Delta P_A$ by the first wheel load adjusting valve 111A and the third wheel load adjusting valve 112A is inhibited. Therefore, electric power consumption can be suppressed. In contrast, when it is determined that the pressure average is less than the predetermined pressure (Step S2), the controller 130 determines whether or not the first differential pressure $\Delta P_A$ between the pressure $P_1$ detected by the first pressure sensor 125A and the pressure $P_3$ detected by the third pressure sensor 126A has exceeded the threshold TH (Step S4).

When it is determined that the first differential pressure $\Delta P_A$ has not exceeded the threshold TH (Step S4), the controller 130 sets each of the first electromagnetic shutoff valve 111Ab and the third electromagnetic shutoff valve 112Ab to an open state (Step S3). In contrast, when it is determined that the first differential pressure $\Delta P_A$ has exceeded the threshold TH (Step S4), the controller 130 sets each of the first electromagnetic shutoff valve 111Ab and the third electromagnetic shutoff valve 112Ab to a closed state (Step S5). With this, the increase in the first differential pressure $\Delta P_A$ at the time of the passing of the curve is suppressed, and therefore, the wheel load variation can be suppressed. It should be noted that since the operations of the second and fourth wheel load adjusting valves 111B and 112B are the same as those of the first and third wheel load adjusting valves 111A and 112A, detailed explanations thereof are omitted.

As a modified example, when the pressure average of the pressure of the first air spring 4A and the pressure of the third air spring 5A is not less than the predetermined pressure, the controller 130 may increase the threshold TH to make the first differential pressure $\Delta P_A$ hardly exceed the threshold, instead of inhibiting closing operations of the first electromagnetic shutoff valve 111Ab and the third electromagnetic shutoff valve 112Ab.

Embodiment 3

Figure 7:
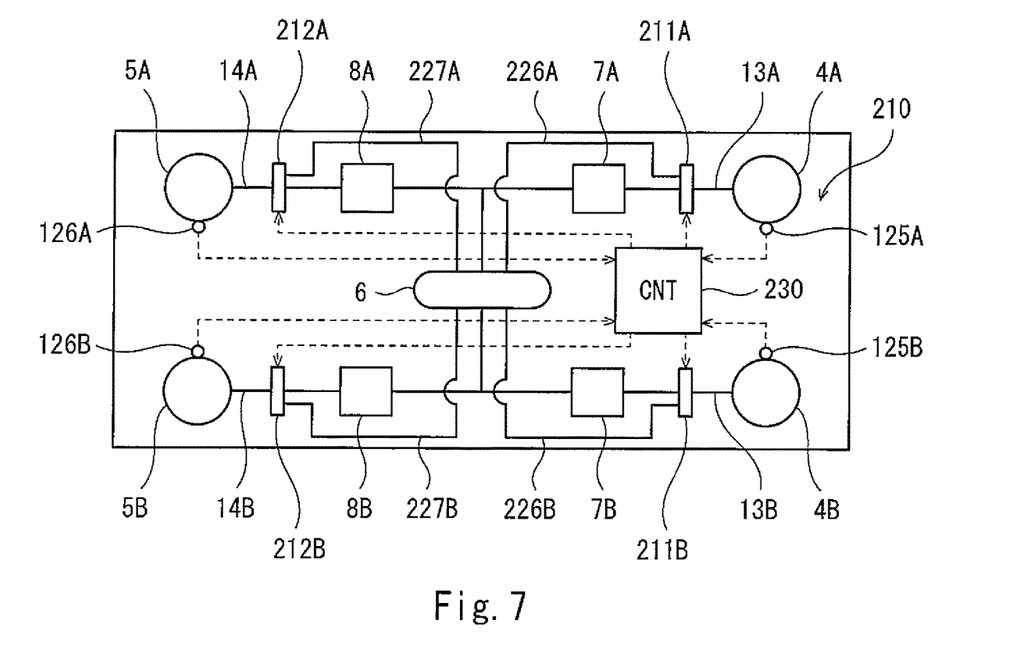
FIG. 7 is a plan view of the wheel load adjusting apparatus of the railcar according to Embodiment 3.

FIG. 7 is a plan view of a wheel load adjusting apparatus 210 of a railcar according to Embodiment 3. The same reference signs are used for the same components as in Embodiments I and 2, and a repetition of the same explanation is avoided. As shown in FIG. 7, the wheel load adjusting apparatus 210 includes a first wheel load adjusting valve 211A provided at the first channel 13A, a second wheel load adjusting valve 211B provided at the second channel 13B, a third wheel load adjusting valve 212A provided at the third channel 14A, and a fourth wheel load adjusting valve 212B provided at the fourth channel 14B. The first, second, third, and fourth wheel load adjusting valves 211A, 2118, 212A, and 212B are electromagnetic switching valves.

The wheel load adjusting apparatus 210 further includes: a first bypass pipe 226A bypassing the first automatic level controlling valve 7A and connecting the first wheel load adjusting valve 211A to the air container 6; a second bypass pipe 226B bypassing the second automatic level controlling valve 7B and connecting the second wheel load adjusting valve 211B to the air container 6; a third bypass pipe 227A bypassing the third automatic level controlling valve 8A and connecting the third wheel load adjusting valve 212A to the air container 6; and a fourth bypass pipe 227B bypassing the fourth automatic level controlling valve 8B and connecting the fourth wheel load adjusting valve 212B to the air container 6. The wheel load adjusting apparatus 210 further includes the first, second, third, and fourth pressure sensors 125A, 125B, 126A, and 126B, and a controller 230. The controller 230 controls the first, second, third, and fourth wheel load adjusting valves 211A, 211B, 212A, and 212B in accordance with the pressures detected by the first, second, third, and fourth pressure sensors 125A, 125B, 126A, and 126B.

Figure 8:
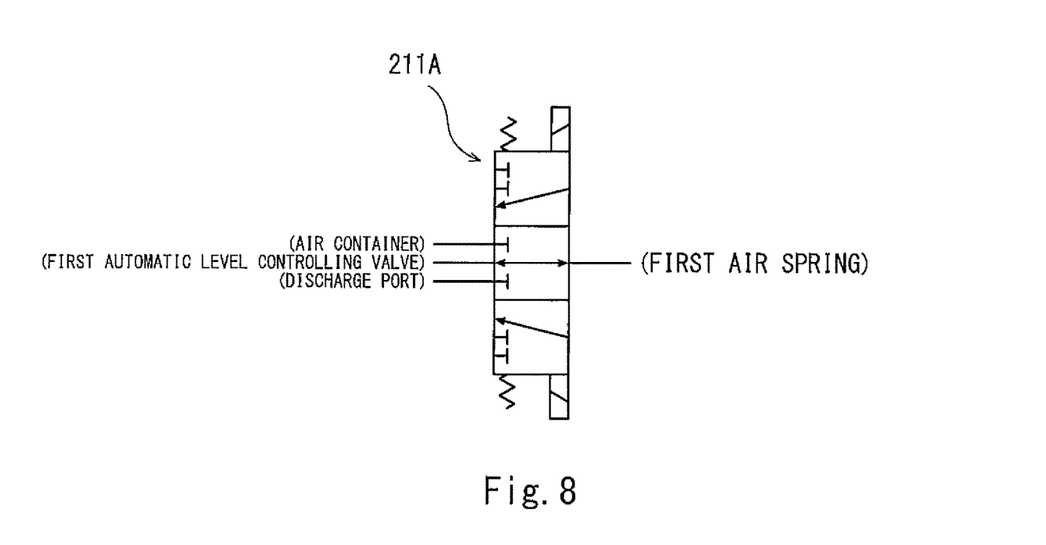
FIG. 8 is a schematic diagram of the wheel load adjusting valve shown in FIG. 7.

FIG. 8 is a schematic diagram of the first wheel load adjusting valve 211A shown in FIG. 7. As shown in FIG. 8, at a neutral position, the first wheel load adjusting valve 211A makes the first air spring 4A communicate with the first automatic level controlling valve 7A. At a first switching position, the first wheel load adjusting valve 211A makes the first air spring 4A communicate with the air container 6. At a second switching position, the first wheel load adjusting valve 211A makes the first air spring 4A communicate with a discharge port that is open to the atmosphere. The first wheel load adjusting valve 211A is being biased by springs so as to be held at the neutral position when electric power is not supplied thereto. It should be noted that since each of the second, third, and fourth wheel load adjusting valves 211B, 212A, and 212B is the same in configuration as the first wheel load adjusting valve 211A, a detailed explanation thereof is omitted.

Figure 9:
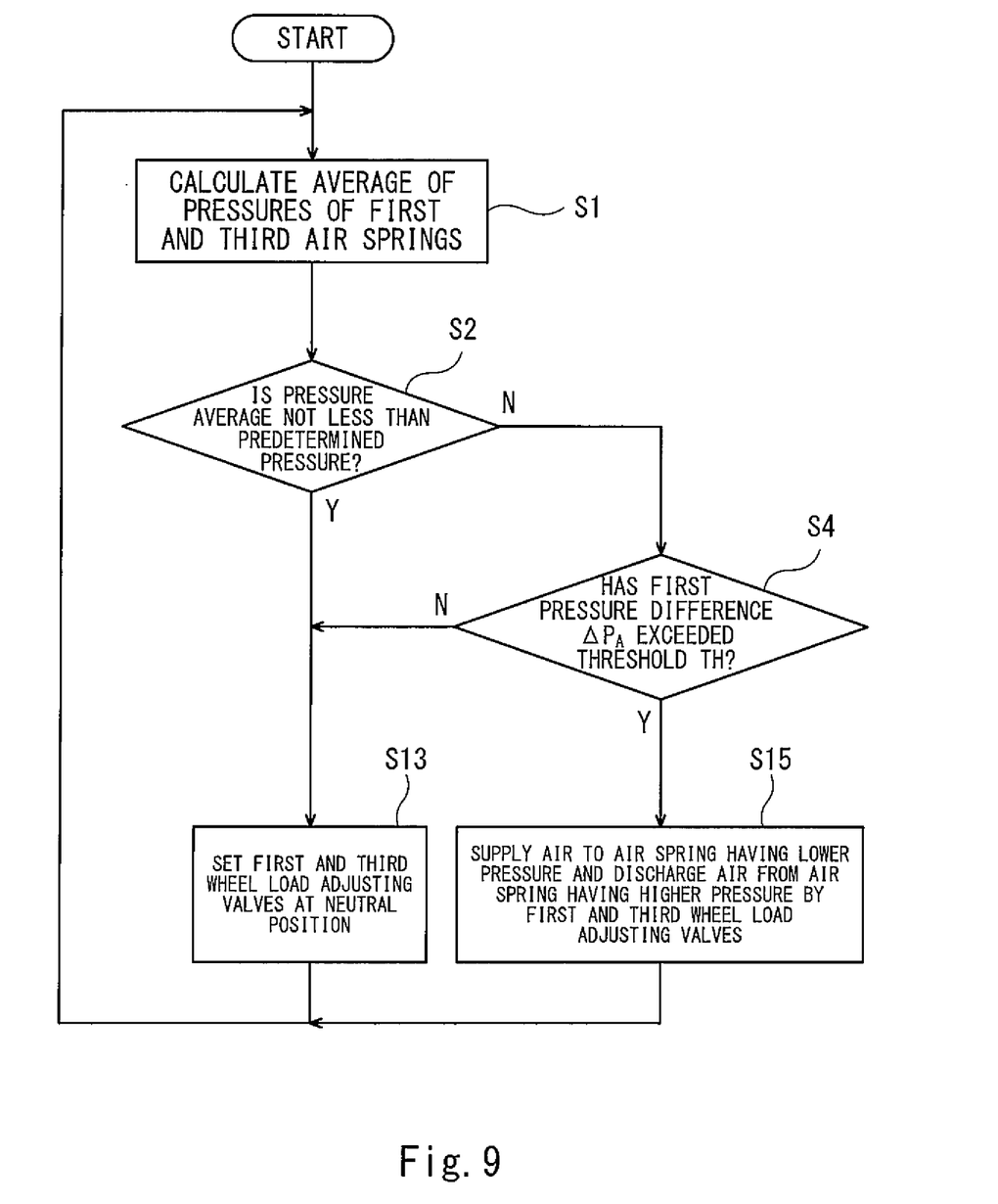
FIG. 9 is a flow chart for explaining operations of the wheel load adjusting apparatus shown in FIG. 7.

FIG. 9 is a flow chart for explaining operations of the wheel load adjusting apparatus 210 shown in FIG. 7. As shown in FIG. 9, since Steps S1, S2, and S4 are the same as those in Embodiment 2, detailed explanations thereof are omitted. If Yes in Step S2, the controller 230 sets each of the first wheel load adjusting valve 211A and the third wheel load adjusting valve 212A to the neutral position (Step S13). This is because it is thought that even if the wheel load variation occurs, any of the wheel loads does not become extremely low. In contrast, if No in Step S2, and Yes in Step S4, the controller 230 controls the first wheel load adjusting valve 211A and the third wheel load adjusting valve 212A to supply compressed air from the air container 6 to an air spring having a lower pressure out of the first air spring 4A and the third air spring 5A (first switching position) and discharge air from an air spring having a higher pressure out of the first air spring 4A and the third air spring 5A (second switching position).

Similarly, when the second differential pressure $\Delta P_B$ between the second air spring 4B and the fourth air spring 5B exceeds the threshold TH, the controller 230 controls the second wheel load adjusting valve 211B and the fourth wheel load adjusting valve 212B to supply compressed air from the air container 6 to an air spring having a lower pressure out of the second air spring 4B and the fourth air spring 5B and discharge air from an air spring having a higher pressure out of the second air spring 4B and the fourth air spring 5B. With this, the increase in the pressure difference between the air springs at the time of the passing of the curve is suppressed, and therefore, the wheel load variation can be suppressed.

As a modified example, when the pressure average of the pressure of the first air spring 4A and the pressure of the third air spring 5A is not less than a predetermined pressure, the controller 230 may increase the threshold TH to make the first differential pressure $\Delta P_A$ hardly exceed the threshold, instead of inhibiting the first wheel load adjusting valve 211A and the third wheel load adjusting valve 212A from switching to the first or second switching position to maintain each of the first wheel load adjusting valve 211A and the third wheel load adjusting valve 212A at the neutral position.

Example and Comparative Example

Figure 10:
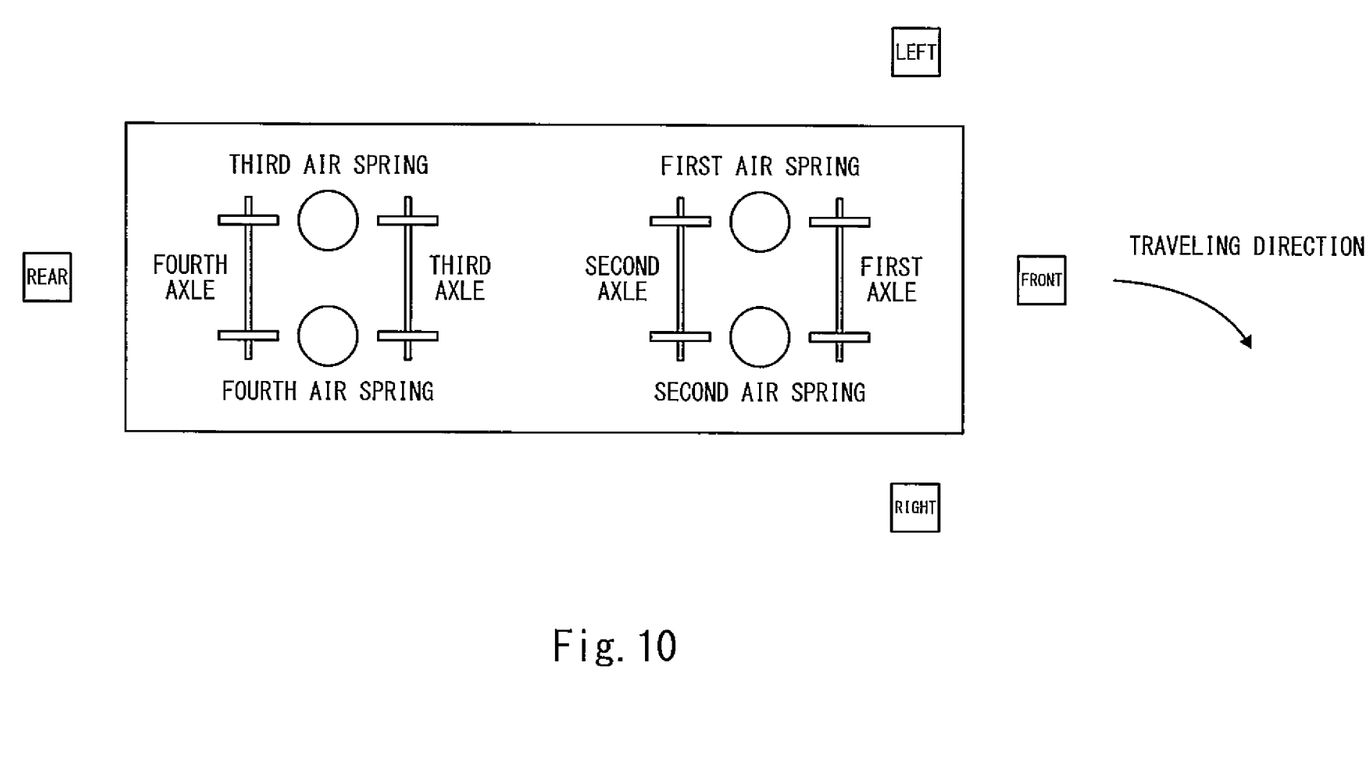
FIG. 10 is a plan view for explaining names of respective portions of the railcar and definitions of directions in simulation.
Figure 11A:
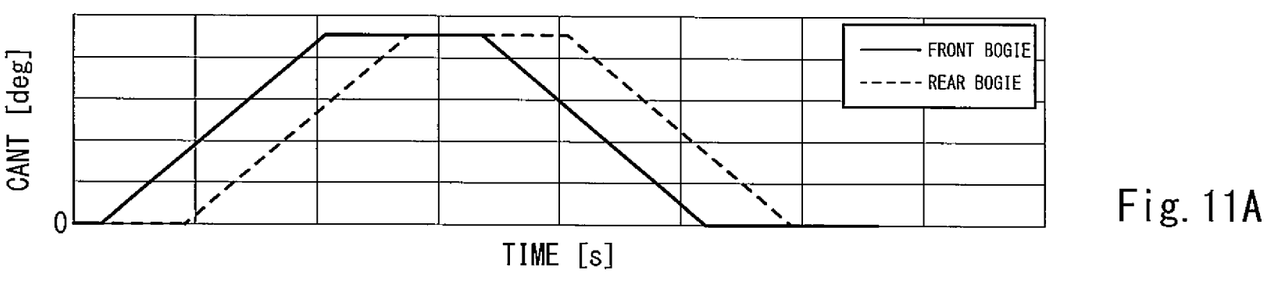
FIG. 11A is a graph showing a relation between a cant and a time in the simulation.
Figure 11B:
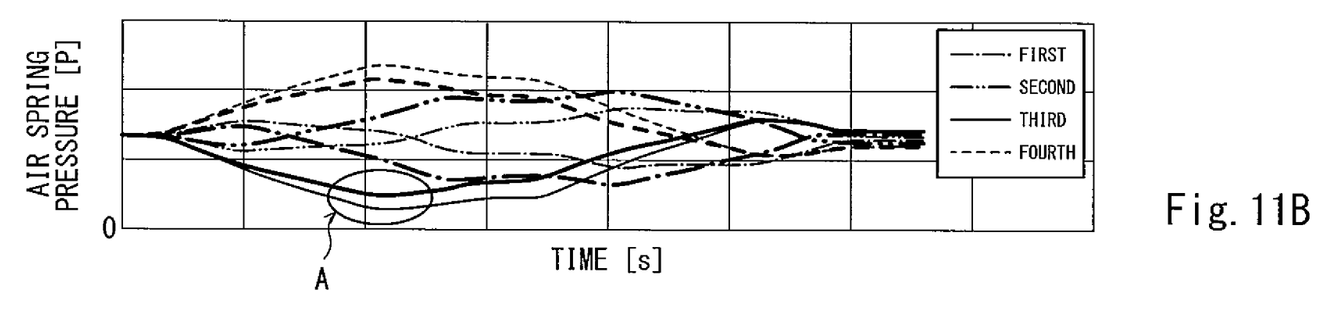
FIG. 11B is a graph showing a relation between an air spring pressure and a time as a simulation result.
Figure 11C:
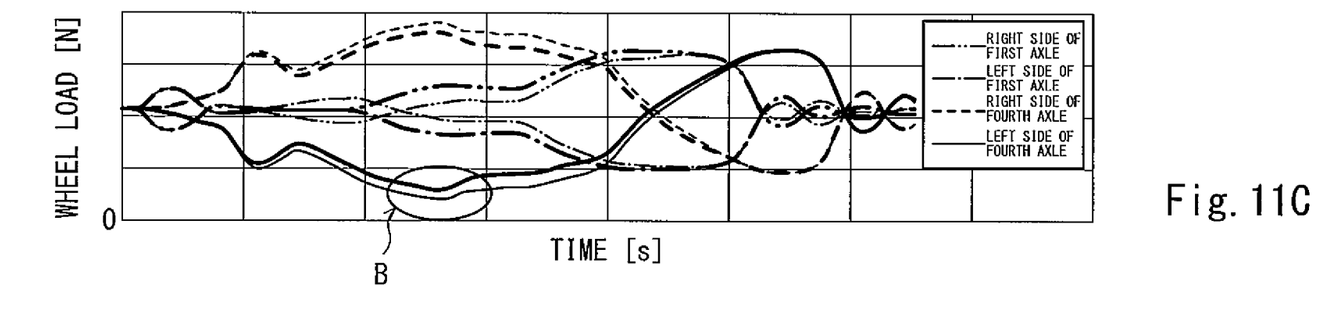
FIG. 11C is a graph showing a relation between wheel load and a time as a simulation result.

FIG. 10 is a plan view for explaining names of respective portions of the railcar and definitions of directions in simulation. FIG. 11A is a graph showing a relation between a cant and a time in the simulation. FIG. 11B is a graph showing a relation between an air spring pressure and a time as a simulation result. FIG. 11C is a graph showing a relation between wheel load and a time as a simulation result. In the simulation, Example corresponds to a railcar on which the wheel load adjusting apparatus of Embodiment 1 is mounted, and Comparative Example corresponds to a railcar on which a wheel load adjusting apparatus is not mounted. Further, Table 1 below shows conditions in the simulation.

TABLE 1

| Shape of Curve [m] | | | | | |
|---|---|---|---|---|---|
| Radius of Curve | Length of Main Curve | Entrance Transition | Exit Transition | Cant [mm] | Speed [km/h] |
| 251 | 26 | 36 | 36 | 90 | 4.6 |

As shown FIGS. 11B and 11C, thick lines show the simulation result of Example, and thin lines show the simulation result of Comparative Example. As shown in FIGS. 11A to 11C, according to the simulation results, in Comparative Example, when the front bogie passed through a main curve, and the rear bogie passed through an entrance transition curve, the pressure of the third air spring at the rear side in the traveling direction and the outer rail side decreased, and the wheel load of the wheel (at a left side of a fourth axle) at the outer rail side of the rear bogie decreased. However, in Example, at the same point in time as above, the decrease in the pressure of the third air spring was suppressed (see a portion shown by A in FIG. 11B), and the decrease in the wheel load of the wheel (at the left side of the fourth axle) at the outer rail side of the rear bogie was suppressed (see a portion shown by B in FIG. 11C). To be specific, it was confirmed that Example is effective to prevent the decrease of the wheel load at the time of the passing of the curve.

The present invention is not limited to the above embodiments, and modifications, additions, and eliminations may be made with respect to the configuration of the present invention. The above embodiments may be combined arbitrarily. For example, a part of a configuration or a method in one embodiment may be applied to another embodiment. Some of components in an embodiment may be separated and extracted arbitrarily from the other of the components in the embodiment.

REFERENCE SIGNS LIST 1 railcar
2 carbody
3A first bogie
3B second bogie
4A first air spring
4B second air spring
5A third air spring
5B fourth air spring
6 air container
7A first automatic level controlling valve
7B second automatic level controlling valve
8A third automatic level controlling valve
8B fourth automatic level controlling valve
10, 110, 210 wheel load adjusting apparatus
11A, 111A, 211A first wheel load adjusting valve
11B, 111B, 211B second wheel load adjusting valve
12A, 112A, 212A third wheel load adjusting valve
12B, 112B, 212B fourth wheel load adjusting valve
13A first channel
13B second channel
14A third channel
14B fourth channel
51A, 51B, 52A, 52B casing
125A first pressure sensor
125B second pressure sensor
126A third pressure sensor
126B fourth pressure sensor
130, 230 controller

The invention claimed is:
1. A wheel load adjusting apparatus for use in a railcar, the railcar comprising:
first and second air springs arranged between a carbody and a first bogie so as to be spaced apart from each other in a car width direction;
third and fourth air springs arranged between the carbody and a second bogie so as to be spaced apart from each other in the car width direction;
first to fourth automatic level controlling valves provided upstream of the first to fourth air springs, respectively, and configured to adjust heights of the first to fourth air springs, respectively, to maintain the heights of the air springs constant; and first to fourth wheel load adjusting valves provided at first to fourth channels, respectively, the first to fourth channels connecting the first to fourth automatic level controlling valves and the first to fourth air springs, respectively, wherein when the railcar passes through a curve, the wheel load adjusting apparatus limits an air supply/air discharge operation of at least one of the first to fourth automatic level controlling valves so as to suppress an increase in a pressure difference between at least two of the first to fourth air springs, when a first differential pressure between the first and third air springs arranged at a first side in the car width direction exceeds a first threshold, the first and third wheel load adjusting valves perform an operation of suppressing an increase in the first differential pressure to limit the air supply/air discharge operation of the first automatic level controlling valve and the air supply/air discharge operation of the third automatic level controlling valve, and when a second differential pressure between the second and fourth air springs arranged at a second side in the car width direction exceeds a second threshold, the second and fourth wheel load adjusting valves perform an operation of suppressing an increase in the second differential pressure to limit the air supply/air discharge operation of the second automatic level controlling valve and the air supply/air discharge operation of the fourth automatic level controlling valve.

2. The wheel load adjusting apparatus according to claim 1, wherein:

when the first differential pressure exceeds the first threshold, the first and third wheel load adjusting valves restrict or shut off the first and third channels, respectively, to limit flow rates of the first and third automatic level controlling valves; and when the second differential pressure exceeds the second threshold, the second and fourth wheel load adjusting valves restrict or shut off the second and fourth channels, respectively, to limit the flow rates of the second and fourth automatic level controlling valves.

3. The wheel load adjusting apparatus according to claim 2 further comprising:

first to fourth pressure sensors configured to detect pressures of the first to fourth air springs, respectively; and a controller configured to control the first to fourth wheel load adjusting valves in accordance with the pressures detected by the first to fourth pressure sensors, wherein:

when at least one of the first and third air springs satisfies a predetermined high pressure condition, the controller inhibits the operation of suppressing the increase in the first differential pressure by the first wheel load adjusting valve and the third wheel load adjusting valve or increases the first threshold; and when at least one of the second air spring and the fourth air spring satisfies the predetermined high pressure condition, the controller inhibits the operation of suppressing the increase in the second differential pressure by the second wheel load adjusting valve and the fourth wheel load adjusting valve or increases the second threshold.

4. The wheel load adjusting apparatus according to claim 3, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

5. The wheel load adjusting apparatus according to claim 2, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

6. The wheel load adjusting apparatus according to claim 1, wherein:

when the first differential pressure exceeds the first threshold, the first and third wheel load adjusting valves operate to supply compressed air from an air container to an air spring having a lower pressure out of the first and third air springs; and when the second differential pressure exceeds the second threshold, the second and fourth wheel load adjusting valves operate to supply the compressed air from the air container to an air spring having a lower pressure out of the second and fourth air springs.

7. The wheel load adjusting apparatus according to claim 6, further comprising:

first to fourth pressure sensors configured to detect pressures of the first to fourth air springs, respectively; and a controller configured to control the first to fourth wheel load adjusting valves in accordance with the pressures detected by the first to fourth pressure sensors, wherein:

when at least one of the first and third air springs satisfies a predetermined high pressure condition, the controller inhibits the operation of suppressing the increase in the first differential pressure by the first wheel load adjusting valve and the third wheel load adjusting valve or increases the first threshold; and when at least one of the second air spring and the fourth air spring satisfies the predetermined high pressure condition, the controller inhibits the operation of suppressing the increase in the second differential pressure by the second wheel load adjusting valve and the fourth wheel load adjusting valve or increases the second threshold.

8. The wheel load adjusting apparatus according to claim 7, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

9. The wheel load adjusting apparatus according to claim 6, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

10. The wheel load adjusting apparatus according to claim 1, further comprising:

first to fourth pressure sensors configured to detect pressures of the first to fourth air springs, respectively; and a controller configured to control the first to fourth wheel load adjusting valves in accordance with the pressures detected by the first to fourth pressure sensors, wherein:

when at least one of the first and third air springs satisfies a predetermined high pressure condition, the controller inhibits the operation of suppressing the increase in the first differential pressure by the first wheel load adjusting valve and the third wheel load adjusting valve or increases the first threshold; and when at least one of the second air spring and the fourth air spring satisfies the predetermined high pressure condition, the controller inhibits the operation of suppressing the increase in the second differential pressure by the second wheel load adjusting valve and the fourth wheel load adjusting valve or increases the second threshold.

11. The wheel load adjusting apparatus according to claim 10, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

12. The wheel load adjusting apparatus according to claim 1, wherein the first to fourth wheel load adjusting valves, casings, and the first to fourth automatic level controlling valves are configured as respective units by accommodating the first to fourth wheel load adjusting valves in the respective casings in which the corresponding first to fourth automatic level controlling valves are accommodated.

\* \* \* \* \*